(12) United States Patent
Lee et al.

(10) Patent No.: US 6,346,703 B1
(45) Date of Patent: Feb. 12, 2002

(54) RESISTIVE BOLOMETER SENSOR

(75) Inventors: Jun Bae Lee, Seoul; Don Hee Lee, Kyonggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/534,496

(22) Filed: Mar. 24, 2000

(30) Foreign Application Priority Data

Mar. 27, 1999 (KR) .............................................. 99-10682

(51) Int. Cl.[7] .................................................. G01J 5/00
(52) U.S. Cl. ................................................... 250/338.1
(58) Field of Search ............................ 250/338.1, 344; 372/32

(56) References Cited

U.S. PATENT DOCUMENTS

| | | | | |
|---|---|---|---|---|
| 4,093,945 A | * | 6/1978 | Collier et al. ............... | 340/279 |
| 4,282,423 A | * | 8/1981 | Volz ............................ | 219/490 |
| 6,236,046 B1 | * | 5/2001 | Watabe et al. ........... | 250/338.1 |

* cited by examiner

Primary Examiner—Ricky Mack
(74) Attorney, Agent, or Firm—Fleshner & Kim, LLP.

(57) ABSTRACT

A resistive bolometer sensor is provided, in which a fixed resistor is replaced with a sensor resistor to reduce an error of an output value due to temperature variation, thereby improving sensitivity. The resistive bolometer sensor comprises: a sensing unit for sensing an infrared ray, the sensing unit including a sensor resistor and three compensation sensor resistors; a supporting unit for supporting the sensing unit, for controlling heat transfer to the outside; and a silicon rim supporting the overall elements of the sensor, for reflecting an external temperature, wherein the sensor resistor senses a resistance value by incident infrared ray, and the three compensation sensor resistors have a bridge structure with the sensor resistor and senses a environmental temperature to compensate a resistance value that varies in accordance with temperature variation.

7 Claims, 4 Drawing Sheets

RESISTIVE BOLOMETER SENSOR

BACKGROUND OF THE INVENTION

1. Field of the Invention

The present invention relates to an infrared ray sensor, and more particularly, to a resistive bolometer sensor in which a bridge circuit is formed on a sensor chip to reduce the production cost and a fixed resistor is replaced with a sensor resistor to reduce an error of an output value due to temperature variation, thereby sensing a temperature more exactly.

2. Background of the Related Art

Recently, sensors are widely used in various fields. As examples of the sensors for sensing infrared rays, there are a thermopile sensor based on thermal conductive effect, a pyroelectric sensor based on superconductive effect, a ferroelectric bolometer for sensing variation of dielectric ratio by applying a bias voltage to a sensor, and a resistive bolometer based on resistance variation.

Especially, the resistive bolometer has a simple fabricating process, saves the cost and facilitates control of sensitivity and noise depending on bias variation. In this respect, the resistive bolometer is used as a temperature sensor or is formed of a sensor array to be applied to an infrared ray camera.

The resistive against environmental temperature variation.

Particularly, the infrared ray sensor is being widely used, as a thermopile sensor is recently applied to a microwave oven to sense a temperature of food so that food can be heated at a desired temperature.

However, the thermopile sensor has problems that it has low sensitivity and is susceptible to a environmental temperature variation. Accordingly, a sensor having higher sensitivity and stability has been required. To meet such requirements, a bolometer sensor has been provided, which has higher sensitivity and is more stable in an abnormal state where a environmental temperature is frequently varied.

Such a resistive bolometer sensor is used to sense a temperature of an object in such a manner that a resistor is formed on a film having a small heat transfer coefficient and absorbs an infrared ray so as to sense resistance variation caused by temperature variation of a resistor.

Alternatively, to avoid variation of the sensor due to variation of a environmental temperature, another resistive bolometer sensor is configured using a bridge circuit so as not to vary a signal due to variation of a environmental temperature.

A bridge circuit of the related art resistive sensor will be described with reference to FIG. 1.

FIG. 1 shows a bridge circuit of the related art resistive sensor. The bridge circuit of the related art resistive sensor includes a sensor resistor ($R_1$) 1 for sensing a temperature of an object, a compensation sensor resistor ($R_2$) 2 for eliminating influence of a environmental temperature, and fixed resistors ($R_3$, $R_4$) 3 and 4 having a bridge structure to avoid variation of the sensor to variation of the environmental temperature.

The compensation sensor resistor 2 forms a material, which reflects an infrared ray, on a top layer.

An output value $V_{out}$ of the bridge circuit is expressed by the following equation 1.

$$V_{out} = V_{ref}\left(\frac{R_1}{R_1 + R_4} - \frac{R_2}{R_2 + R_3}\right) \quad \text{[Equation 1]}$$

The sensitivity is the highest when $$\frac{R_2}{R_3} = 1.$$

Therefore, a circuit configuration having four resistors with the same resistance values if possible significantly acts on the size of an initial zero point signal and sensitivity of the sensor. For this reason, to allow the resistors 1, 2, 3 and 4 to obtain the same resistance values, a bridge circuit is configured based on resistance values similar to the resistors 1 and 2 by considering errors of the fixed resistors 3 and 4.

However, the bridge circuit of the related resistive sensor has several problems.

Since two fixed resistors having resistance errors of 1% or greater are used, it is difficult to control the initial zero point signal and match a given resistance value produced by the process with an actual resistance value varied depending on a environmental temperature. This limits the configuration of a resistive sensor having optimal sensitivity.

Furthermore, in view of the aspect that the environmental temperature varies as units are used, the resistor of the sensor and the output of the compensation sensor vary but the two fixed resistors constituting a bridge circuit has fixed values without variation. This reduces sensitivity or causes wrong output results, thereby resulting in that the temperature is not exactly sensed.

SUMMARY OF THE INVENTION

Accordingly, the present invention is directed to a resistive bolometer sensor that substantially obviates one or more of the problems due to limitations and disadvantages of the related art.

An object of the present invention is to provide a resistive bolometer sensor in which four resistors are formed to facilitate control of an initial zero point signal and reduce a resistance error, thereby improving sensitivity.

Another object of the present invention is to provide a resistive bolometer sensor in which a fixed resistor is replaced with a sensor resistor to reduce an error of an output value due to temperature variation, thereby improving sensitivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a resistive bolometer sensor comprises: a sensing unit for sensing an infrared ray, the sensing unit including a sensor resistor and three compensation sensor resistors; a supporting unit for supporting the sensing unit, for controlling heat transfer to the outside; and a silicon rim supporting the overall elements of the sensor, for reflecting an external temperature, wherein the sensor resistor senses a resistance value by incident infrared ray, and the three compensation sensor resistors have a bridge structure with the sensor resistor and senses a environmental temperature to compensate a resistance value that varies in accordance with temperature variation. Furthermore, the resistive bolometer sensor is characterized in that a reflecting film is deposited on the compensation sensor resistors to reflect the infrared ray. Finally, the resistive bolometer sensor is characterized in that the sensing unit is configured in such a manner that a plurality of sensor resistors and compensation sensors are formed on one chip in a bridge structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
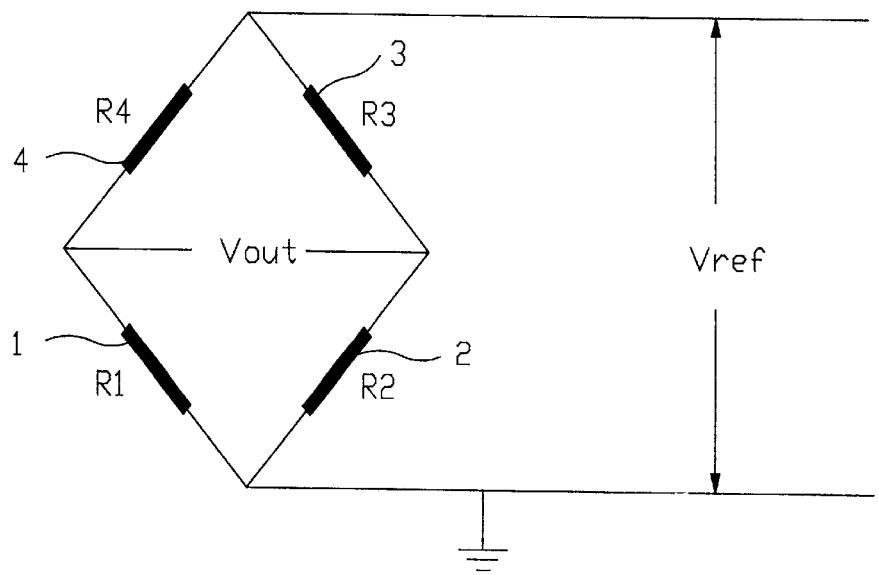
FIG. 1 is a schematic view illustrating a bridge circuit of a related art resistive sensor.
Figure 2:
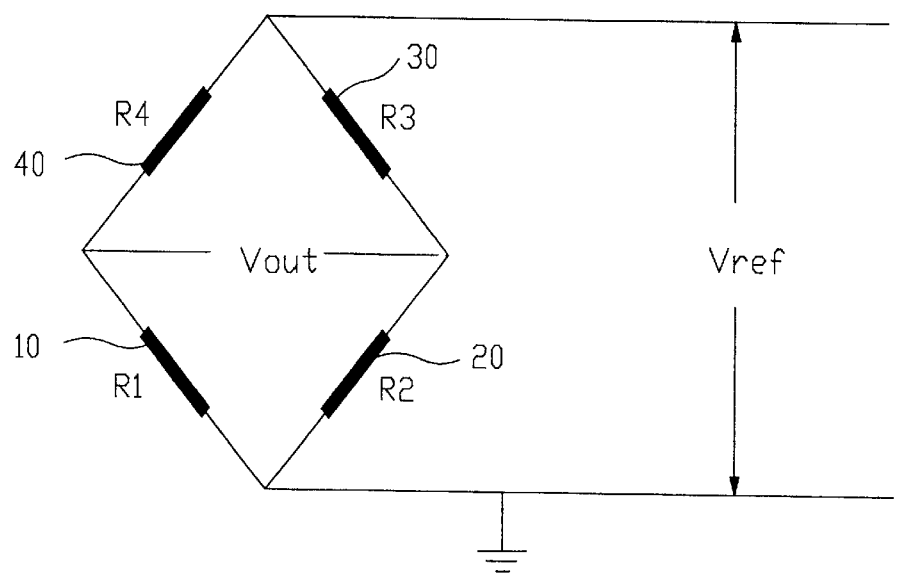
FIG. 2 is a circuit diagram illustrating a bridge circuit of a resistive bolometer sensor according to the present invention.

A bridge circuit of a resistive bolometer sensor according to the present invention will be described with reference to FIG. 2.

The bridge circuit of the resistive bolometer sensor includes a sensor resistor ($R_1$) 10 for sensing a temperature of an object in accordance with resistance variation by incident infrared ray, and compensation sensor resistors ($R_2$, $R_3$ and $R_4$) 20, 30 and 40 for eliminating influence of a environmental temperature.

The aforementioned bridge circuit is configured in such a manner that different four resistors on a single chip are formed on a supporting unit having the same heat transfer structure by the same process as one another.

Figure 3A:
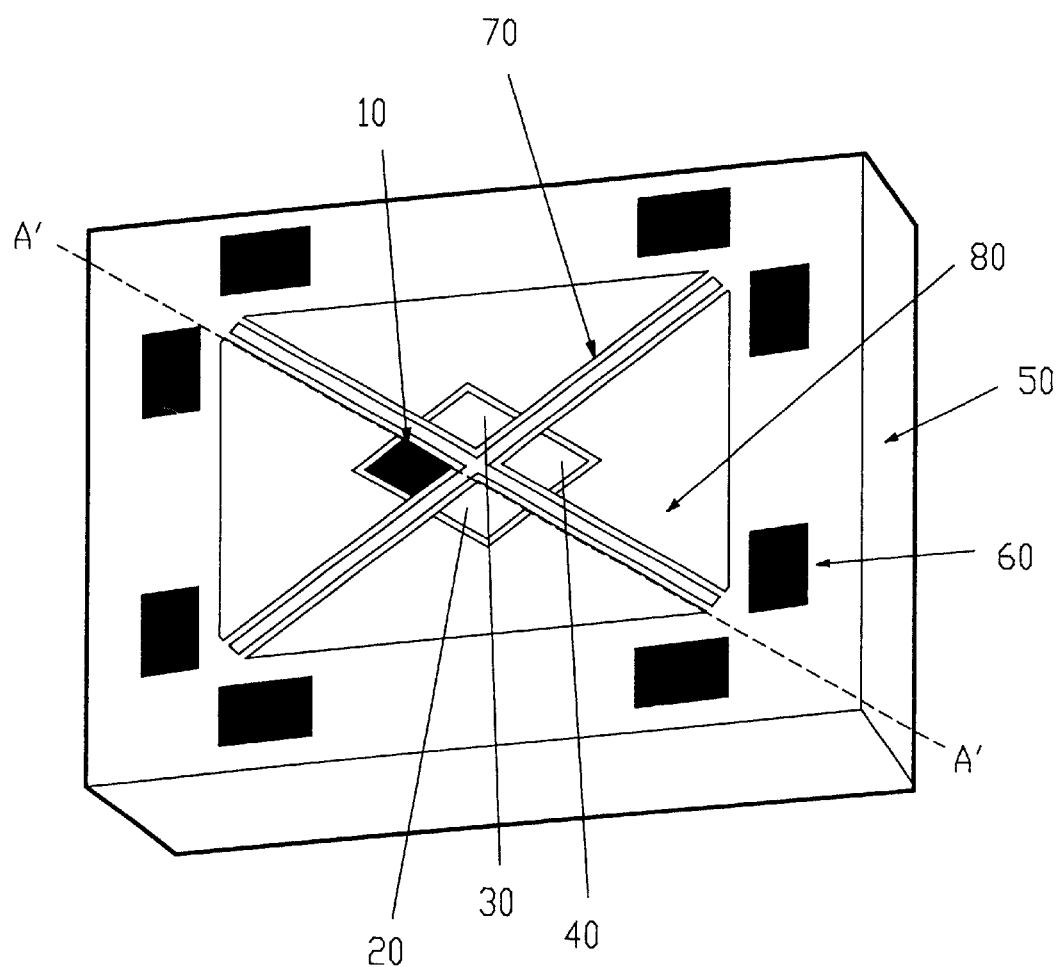
FIG. 3a is a perspective view of the resistive bolometer sensor according to the present invention.
Figure 3B:
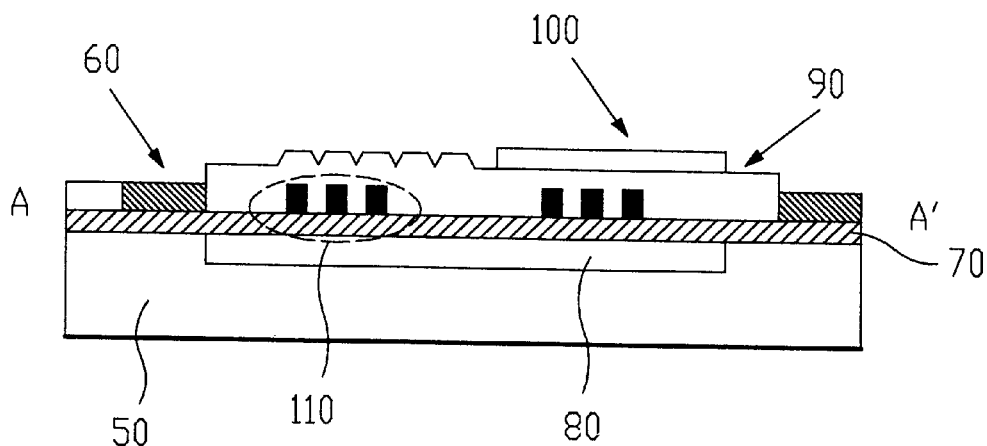
FIG. 3b is a sectional view of the resistive bolometer sensor according to the present invention.

A perspective view and a sectional view of the resistive bolometer sensor of the bridge circuit applied to the semiconductor process will be described with reference to FIGS. 3a and 3b.

An insulating film 70 for supporting a resistor is formed on a silicon substrate 50. A pad 60, the sensor resistor 10 and the three compensation sensor bridge resistors 20, 30 and 40 are formed on the insulating film 70. The pad 60 connects with the outside. An insulator 90 is formed on the compensation sensor bridge resistors 20, 30 and 40, and an infrared ray reflecting film 100 is formed on the insulator 90.

As aforementioned, the sensor resistors 10, 20, 30 and 40 are simultaneously formed by the semiconductor process, and a material such as aluminum for reflecting the infrared ray is respectively deposited on top layers of the sensor resistors 20, 30 and 40 except the sensor resistor 10. Thus, the sensor resistor 10 reacts to environmental temperature variation and externally incident infrared ray while the sensor resistors 20, 30 and 40 react to environmental temperature variation only.

A space is formed between the resistors 10, 20, 30 and 40 and the silicon substrate 50 so that small heat transfer can be achieved therebetween.

Figure 3C:
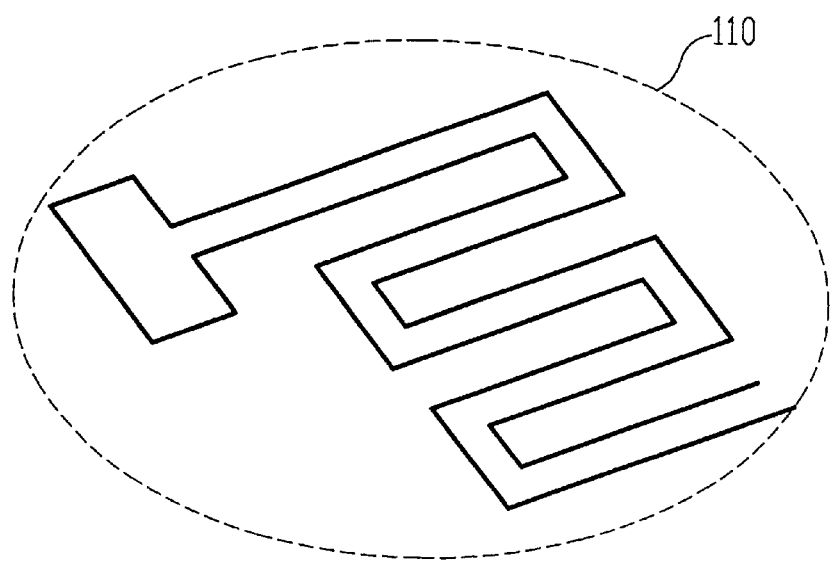
FIG. 3c is a schematic view illustrating a resistance pattern of a sensor and compensation sensor according to the present invention.

Furthermore, a zig-zag shaped resistance pattern 110 is formed as shown in FIG. 3c to control the size of a resistor depending on the length thereof.

In case where the three resistors 20, 30 and 40 except the resistor 10 are changed to compensation sensors, their resistance values are changed due to environmental temperature variation.

In case of a frequently used metal resistor, its resistance value is expressed by the following equation 2.

[Equation 2]

$$R=R_0(1+aT),$$

where $R_0$ is a reference resistance value depending a material, T is a temperature of a resistor, and a is a coefficient value of a resistance temperature depending on a material. The resistance value of the metal resistor is almost linearly changed.

The bridge circuit of the present invention includes four bolometer sensors. of the bolometer sensors, the sensor resistor 10 for sensing the infrared ray has no reflecting film and exchanges infrared ray energy with the outside.

By contrast, by means of the reflecting film 100, the other compensation sensor resistors 20, 30 and 40 minimize an error of their output values when the environmental temperature is rapidly varied, while minimizing exchange of infrared ray energy with the outside.

First Embodiment

When resistors having external voltages of $V_{ref}$=5V and resistances of 3 k$\Omega$ at a room temperature of 20° C. have resistance temperature coefficient values of 0.003 (which is equivalent to a general metal object), their output values are observed.

It is assumed that the sensor resistor 10 has a varied resistance value of 5% greater than a environmental resistance value by heat exchange with an external object. The varied resistance value of the sensor resistor 10 is obtained as follows, using the equations 1 and 2.

$$R_2=R_3=R_4=R_0(1+aT),$$

where a=0.003, T=about 300K.

Accordingly, when the resistors 20, 30 and 40 are used as the compensation sensor resistors, the basic varied equation of the resistor 10 is equal to those of the resistors 20, 30 and 40.

The resistor 10 absorbs an infrared ray and thus has an increased resistance value depending on a temperature. In this case, the resistance value increases by 5% in accordance with temperature increase by 20° C.

The increased resistance value is expressed as follows.
First resistance value increase:

$$R_1 = R_0(1+aT) + 0.05 * R_0(1+aT) = 1.05 * R_0(1+aT)$$

Second resistance value increase:

$$R_1 = 1.05 * R_0(1+aT) + 0.05 * R_0(1+aT) = 1.1 * R_0(1+aT)$$

The first resistance value of $R_1$ may be applied to the equation 1 as follows.

$$V_{out} = 5 * \left( \frac{1.05 * R_0(1+aT)}{R_0(1+aT) + 1.05 * R_0(1+aT)} - \frac{1}{2} \right)$$

$$= 5 * \left( \frac{1.05}{2.05} - \frac{1}{2} \right)$$

$$= 0.061$$

Next, the second resistance value of $R_1$ may be applied to the equation 1 in the same manner as above and the resultant value is as follows.

$$V_{out} = 0.061$$

As aforementioned, when the resistors 20, 30 and 40 are used as the compensation sensor resistors, the bridge circuit has certain output values in accordance with the environmental temperature variation.

Figure 4:
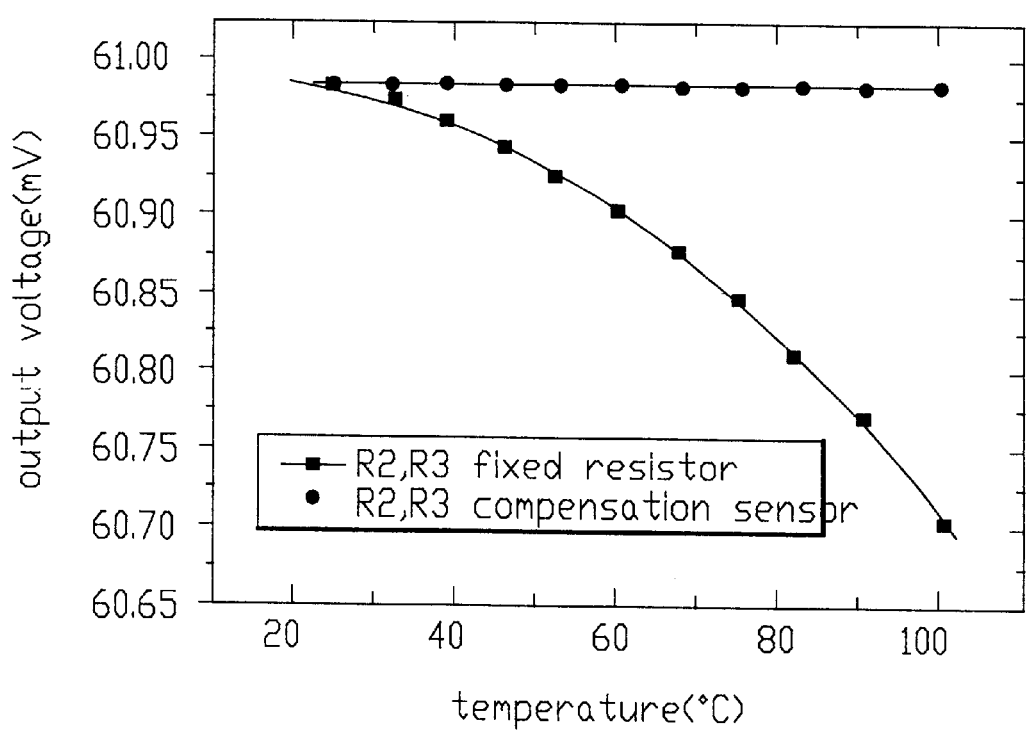
FIG. 4 is a comparison graph illustrating output values of a bridge circuit by variation of environmental temperature.

The output values of the bridge circuit when the environmental temperature ranges between 20° C. and 100° C. are shown in FIG. 4.

As shown in FIG. 4, it is noted that the output values of the bridge circuit are varied as the environmental variation increases if the resistor 20 is only used as the compensation sensor resistor. However, if the resistors 20, 30 and 40 are all used as the compensation sensor resistors, the output values of the bridge circuit are uniform.

Accordingly, to exactly read an actual temperature of the object under the circumstances where the environmental temperature is frequently varied, the three compensation sensors are used in the present invention.

As aforementioned, the resistive bolometer sensor of the present invention has the following advantages.

Since different four resistors on a single chip are formed on the supporting unit having the same heat transfer by the same process as one another, the production cost can be saved.

Particularly, the three sensors are used as the compensation sensors in a microwave oven or oven having a rapid temperature variation. Thus, errors of the output values due to temperature variation can remarkably be reduced, thereby sensing a temperature more exactly.

It will be apparent to those skilled in the art that various modifications and variations can be made in the resistive bolometer sensor according to the present invention without departing from the spirit or scope of the invention. Thus, it is intended that the present invention covers the modifications and variations of the invention provided they come within the scope of the appended claims and their equivalents.

What is claimed is:

1. A resistive bolometer sensor comprising:

a sensing unit for sensing an infrared ray, the sensing unit including a sensor resistor and three compensation sensor resistors;

a supporting unit for supporting the sensing unit, for controlling heat transfer to the outside; and a silicon rim supporting the overall elements of the sensor, for reflecting an external temperature, wherein the sensor resistor senses a resistance value by incident infrared ray, and the three compensation sensor resistors have a bridge structure with the sensor resistor and senses a environmental temperature to compensate a resistance value that varies in accordance with temperature variation.

2. The resistive bolometer sensor as claimed in claim 1, wherein the sensing unit is configured in such a manner that a plurality of sensor resistors and compensation sensors are formed on one chip in a bridge structure.

3. The resistive bolometer sensor as claimed in claim 1, further comprising a reflecting film, which reflects the infrared ray, deposited on the plurality of compensation sensors.

4. The resistive bolometer sensor as claimed in claim 3, wherein the reflecting film is of aluminum.

5. A resistive bolometer sensor comprising:

a sensing unit for sensing an infrared ray;

a supporting unit for supporting the sensing unit and controlling heat transfer to the outside;

a silicon rim for supporting the overall units of the sensor and reflecting an external temperature;

a sensor resistor for sensing variation of a resistance value by incident infrared ray; and three compensation sensor resistors formed in a bridge structure with the sensor resistor, for sensing a environmental temperature to compensate variation of the resistance value by environmental temperature variation.

6. The resistive bolometer sensor as claimed in claim 5, wherein the sensing unit has a plurality of fixed resistors consisting of three compensation sensor resistors and a sensor resistor simultaneously formed on one chip.

7. The resistive bolometer sensor as claimed in claim 6, wherein the fixed resistors have zig-zag shapes to control their sizes in accordance with their lengths.

* * * * *